United States Patent [19]
Sakakibara et al.

[11] Patent Number: 5,367,883
[45] Date of Patent: Nov. 29, 1994

[54] REFRIGERATION SYSTEM

[75] Inventors: Hisayoshi Sakakibara, Nishio; Keiichi Kitamura, Handa; Shin Honda, Nagoya, all of Japan

[73] Assignee: Nippondenso Co., Ltd., Kariya, Japan

[21] Appl. No.: 25,414

[22] Filed: Mar. 1, 1993

[30] Foreign Application Priority Data

Mar. 2, 1992 [JP] Japan .................. 4-044596
Feb. 8, 1993 [JP] Japan .................. 5-019936

[51] Int. Cl.$^5$ .................. B60H 1/00; F25B 47/00
[52] U.S. Cl. .................. 62/85; 62/114; 62/475
[58] Field of Search .................. 62/77, 84, 85, 114, 62/468, 475, 474

[56] References Cited

U.S. PATENT DOCUMENTS

| 2,163,899 | 6/1939 | Walker et al. | 62/114 |
| 2,548,965 | 4/1951 | Gaugler | 62/474 |
| 2,628,484 | 2/1953 | Ayres et al. | 62/474 |
| 2,702,993 | 3/1955 | Harris | 62/474 |
| 4,755,316 | 7/1988 | Magid et al. | 252/68 |
| 5,092,747 | 3/1992 | Irino | 417/312 |
| 5,184,478 | 2/1993 | Kutsuna et al. | 62/468 |
| 5,198,139 | 3/1993 | Bierschenk et al. | 252/68 |
| 5,218,832 | 6/1993 | Woolley | 62/84 |

Primary Examiner—Henry A. Bennett
Assistant Examiner—William C. Doerrler
Attorney, Agent, or Firm—Cushman Darby & Cushman

[57] ABSTRACT

A refrigeration system, wherein without providing a drier for removing the moisture entering the cycle, stable operation of the refrigeration system is made possible by setting the balanced moisture concentration of the refrigerant during operation to less than 350 ppm by relatively selecting the moisture permeations of the lines upstream and downstream of the compressor and by using a refrigerant with a higher saturated moisture concentration. Further, as the lubricating oil circulating in the freezing circuit mixed in the refrigerant, use is made of one with a saturated moisture concentration higher than that of the refrigerant.

12 Claims, 9 Drawing Sheets

REFRIGERATION SYSTEM

BACKGROUND OF THE INVENTION

1. Field of the Invention

The present invention relates to a refrigeration system, more particularly to a refrigeration system suitable for use in an automobile air-conditioner.

2. Description of the Related Art

In an automobile air-conditioner, the compressor is turned by receiving the driving force from the automobile engine, so the compressor is also placed in the same vibration system as the automobile engine. On the other hand, the other components constituting the automobile air-conditioner, for example, the condenser and evaporator, are affixed to the automobile body, are in a different vibration system from the compressor. Therefore, in an automobile air-conditioner, usually rubber hoses are arranged at the suction side of the compressor and at the discharge side of the compressor and these rubber hoses are used as the refrigerant lines.

When rubber hoses are used, however, it is impossible to avoid having the moisture in the air pass through the rubber hoses and enter the refrigeration system. The moisture which enters the refrigeration system causes frosting due to the cooling action accompanying the pressure reduction and expansion at the time of passing the expansion means of the refrigeration system. When the amount of moisture is high, this frosting may end up blocking the orifice of the expansion means.

Therefore, in conventional air-conditioners, a drier has been used to remove the moisture entering into the refrigeration system. Usually, the drier consists of silica gel or other desiccants accommodated in a permeable bag and is disposed in the receiver in the refrigeration system so as to absorb moisture from the refrigerant flowing into the receiver.

If such a drier is used, however, not only does the cost of the apparatus rise by the price of the drier itself, but also extra space becomes required for installing the drier in the receiver, which goes against the object of saving space.

Further, while the drier is effective for removing moisture from the refrigerant, it cannot remove unlimited amounts of moisture, so a drier which has absorbed more than a predetermined amount of moisture has to be replaced. This is extremely disadvantageous in terms of the maintenance of the refrigeration system.

SUMMARY OF THE INVENTION

The present invention was made to resolve the above problems and has as its object enabling operation of a refrigeration system without the use of a drier even when use is made of moisture permeable lines such as rubber hoses for part of the refrigerant lines such as in an automobile air-conditioner and entry of moisture into the refrigerant is unavoidable.

The present invention, as a means for achieving the above object, provides a refrigeration system provided with a compressor which compresses and discharges a refrigerant, a condenser which condenses the refrigerant discharged from the compressor, an expansion means which reduces the pressure and expands the liquid refrigerant condensed by the condenser, an evaporator which causes the refrigerant reduced in pressure by the expansion means to evaporate, and refrigerant lines connected these equipment and constituting a closed circuit, wherein a moisture permeable material is used for part cf the refrigerant lines, a refrigerant is used which has a saturated moisture concentration of at least 350 ppm in the low temperature and low pressure state at the downstream side of the expansion means during operation of the compressor, lubricating oil for the compressor is mixed in with the refrigerant, and the refrigerant and lubricating oil are made to circulate in the circuit of the refrigerant lines without providing a drier for absorbing the moisture.

As the refrigerant in this case, for example, use may be made of the refrigerant HFC134a or the refrigerant HFC22.

As the lubricating oil, for example, it is preferable to use one which has a higher saturated moisture concentration than the saturated moisture concentration of the refrigerant, such as a polyalkyleneglycol type synthetic oil.

Further, in the selection of the material of the refrigerant lines of the refrigeration system, it preferable to set the moisture permeation of the refrigerant line at the discharge side of the compressor to be greater than the moisture permeation of the refrigerant line at the suction side.

Still further, in the selection of the refrigerant of the refrigeration system, it is suitable to select a refrigerant with a saturated moisture concentration in the low temperature and low pressure state at the downstream side of the expansion means higher than moisture concentration in the state where the amounts of moisture entering and leaving during operation of the refrigeration system are balanced.

In the refrigeration system of the present invention, use is made of a moisture permeable material for part of the refrigerant lines and a refrigerant is used which has a saturated moisture concentration in the low temperature and low pressure state at the downstream side of the expansion means of at least 350 ppm, so there is no need to provide a drier for absorbing the moisture in the circuit of the refrigerant lines. The moisture entering into the refrigerant does not condense from it, so it is possible to eliminate the problems such as blocking of the expansion means due to frosting caused by condensed moisture.

Further, in the present invention, the lubricating oil circulating in the refrigeration system along with the refrigerant is one having a saturated moisture concentration higher than the saturated moisture concentration of the refrigerant, so during the actuation of the refrigeration system, it is possible for a larger amount of moisture to be dissolved into the lubricating oil rather than the refrigerant, whereby it is possible to reduce the refrigerant moisture concentration during operation of the refrigeration system.

In particular, the presence of moisture in the refrigerant becomes a problem mainly due to frosting when passing through the expansion means. This frosting is limited to the time when the refrigeration system is actuated, that is, when adiabatic expansion occurs due to passage through the expansion means, so the effect of reducing the refrigerant moisture concentration during the actuation of the refrigeration system is practical and extremely high.

In other words, even if moisture condenses from the refrigerant in the state where the refrigeration system is stopped, since the refrigeration system is not operating, the condensed moisture cannot create any problems in the operation of the refrigeration system.

In addition, in the present invention, during the operation of the compressor, the moisture mainly permeates through the rubber hose at the suction side of the compressor to enter the refrigerant and permeates through the rubber hose at the discharge side of the compressor to be discharged into the atmosphere, as shown by our experiments and studies. Based on these findings, the material of the refrigerant line at the suction side of the compressor and the material of the refrigerant line at the discharge side of the compressor are made different so as to make the refrigerant line at the discharge side of the compressor higher in moisture permeability. Therefore, not only is it possible to quickly discharge into the atmosphere the moisture entering the refrigeration system in the factory and reach a balanced moisture concentration in a short time, but also it is possible to hold to a low level the balanced moisture concentration at all times during operation.

In this way, in the refrigeration system of the present invention, the refrigeration system can be 10 operated without the use of the drier which had been used in conventional refrigeration systems, so the cost can be reduced by the price of the drier itself, the space for installing the drier becomes unnecessary, and the labor involved in replacing the drier can be saved.

BRIEF DESCRIPTION OF THE DRAWINGS

Other objects, features, and advantages of the present invention will be clear from the following detailed description given with reference to the drawings, wherein.

DESCRIPTION OF THE PREFERRED EMBODIMENTS

We engaged in various studies to achieve the object of the present invention. First, we studied how to prevent the entry of moisture into the refrigeration system, but we reached the conclusion that in an apparatus like an automobile air-conditioner where use is made of flexible hoses, typically rubber hoses, the permeation of moisture is unavoidable. That is, for something where permeation of moisture is inherently unavoidable, even when the flexible hose is made by a material resistant to permeation of moisture, the only difference is that the time until equalization of the water vapor pressure at the inside of the flexible hose, which is proportional to the refrigerant moisture concentration, with the atmospheric water vapor partial pressure will be longer or shorter. After a long time passes, entry of moisture is unavoidable in both cases. In other words, even if a difference is given to the time until the entry of the moisture by changing the material of the flexible hose, eventually entry of the moisture until the saturated moisture concentration will be unavoidable.

Therefore, we turned our attention to providing a refrigeration system which does not suffer from the problems such as frosting even in a state with moisture entering it based on the assumption that moisture would enter the refrigeration system.

We therefore first conducted experiments and studies on the moisture concentration which could enter a refrigerant in the refrigeration system during operation.

Figure 1:
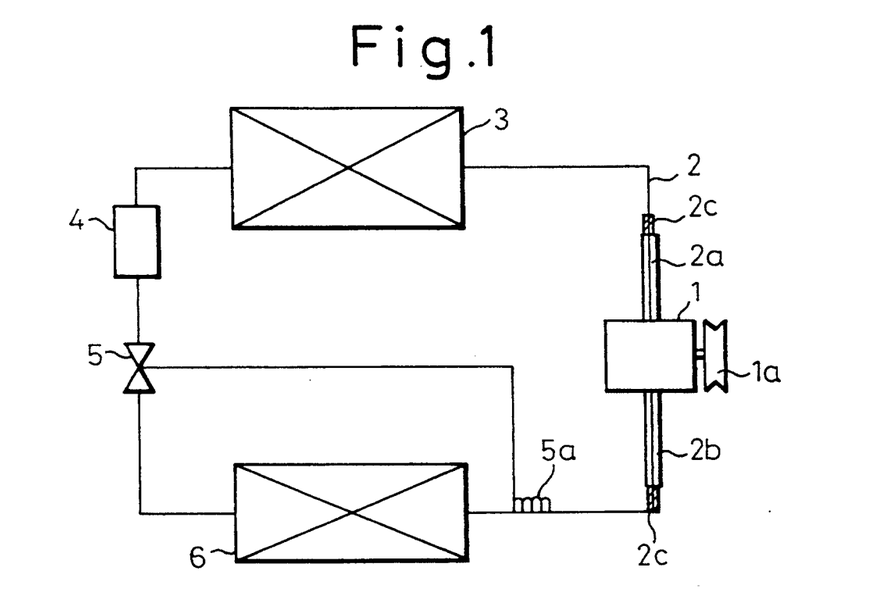
FIG. 1 is a constitutional view of a refrigeration system showing one example of the present invention.

FIG. 1 shows an outline of the refrigeration system of the present invention used for the experiments. This refrigeration system is provided with a compressor 1, refrigerant lines 2, a condenser 3, a receiver 4, an expansion valve 5, and an evaporator 6.

Figure 2:
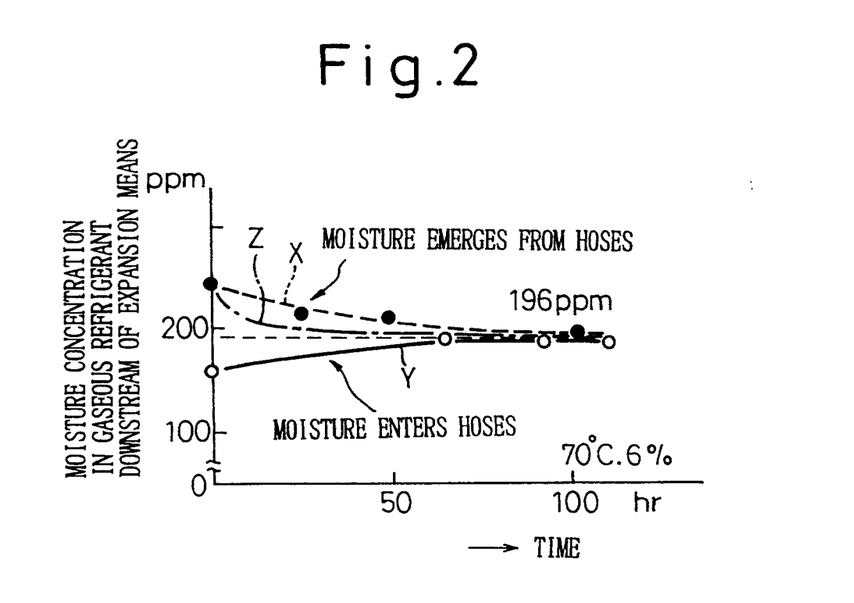
FIG. 2 is an explanatory view showing the state of moisture balance of the refrigeration system.
Figure 5:
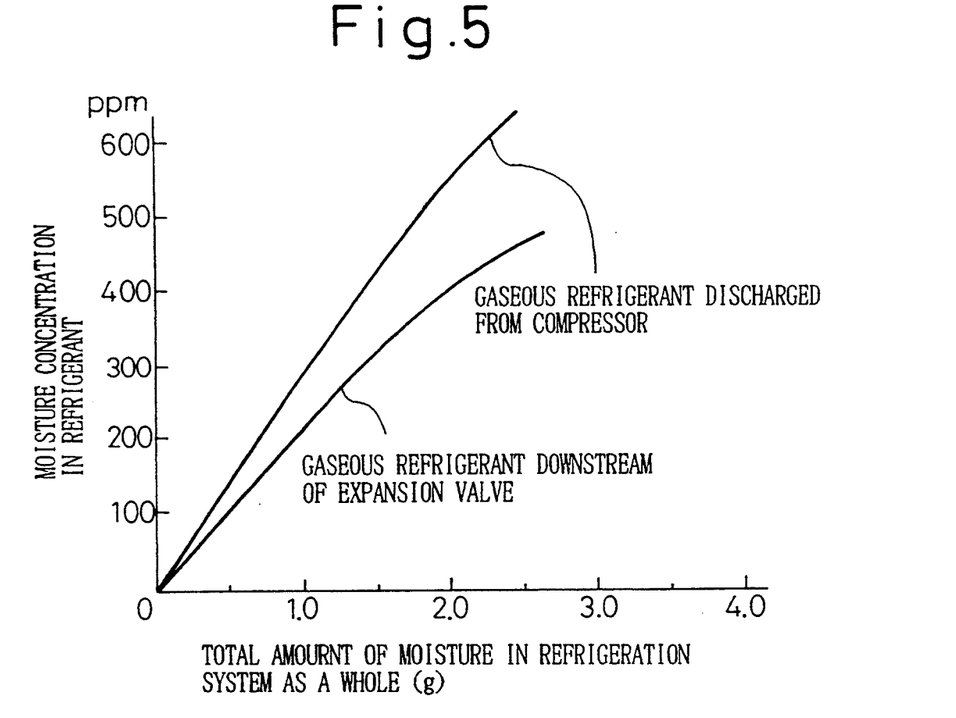
FIG. 5 is an explanatory view showing the relationship between the total amount of the moisture of the refrigeration system as a whole and the saturated moisture concentration.

FIG. 2 is an explanatory view showing the results of our studies. The horizontal axis shows the time, while the vertical axis shows the moisture concentration included in the gaseous refrigerant downstream of the expansion means 5, for example, expansion valve, of the refrigeration system of FIG. 1 used in the experiment. The moisture concentration is proportional to the total amount of the moisture of the refrigeration system as a whole, as shown in FIG. 5. Here, the refrigerant moisture concentration indicates the ratio of the weight of the moisture alone to the weight of the refrigerant including the moisture. In the figure, the broken line X shows the changes in the refrigerant moisture concentration after excess moisture is deliberately placed in the refrigeration system in advance. On the other hand, the solid line Y in the figure shows how the refrigerant moisture concentration of a refrigerant with an initially small moisture concentration changes due to later entry of moisture from the outside.

As shown in FIG. 2, despite the initial state of the refrigerant, it was confirmed that, along with the passage of time, the refrigerant moisture concentrations in the refrigeration system approach a substantially constant value. This is believed to be because if the water vapor partial pressure inside the flexible hose, which is determined by the refrigerant moisture concentration, is higher than the partial pressure of the water vapor in the outside air, the moisture permeates to the outside air side from the refrigerant through the flexible hose, while if the refrigerant moisture concentration is lower, when the partial pressure of the water vapor inside the flexible hose is lower than the partial pressure of the water vapor in the outside air, moisture permeates the flexible hose from the air and enters the refrigerant side.

When using a flexible hose, where moisture permeation is thus unavoidable, the refrigerant moisture concentration in the refrigeration system balancing with the atmosphere converges to a set value (value of the broken line in FIG. 2) determined by the temperature, humidity, and other atmospheric conditions. Below, the convergence of the refrigerant moisture concentration to a set value after the elapse of a sufficient amount of time will be referred to as balancing of the moisture, while the refrigerant moisture concentration converged to the set value will be referred to as balanced moisture concentration of the refrigerant under those conditions.

Therefore, we studied the partial pressure of water vapor during the operation of the refrigeration system.

Figure 3:
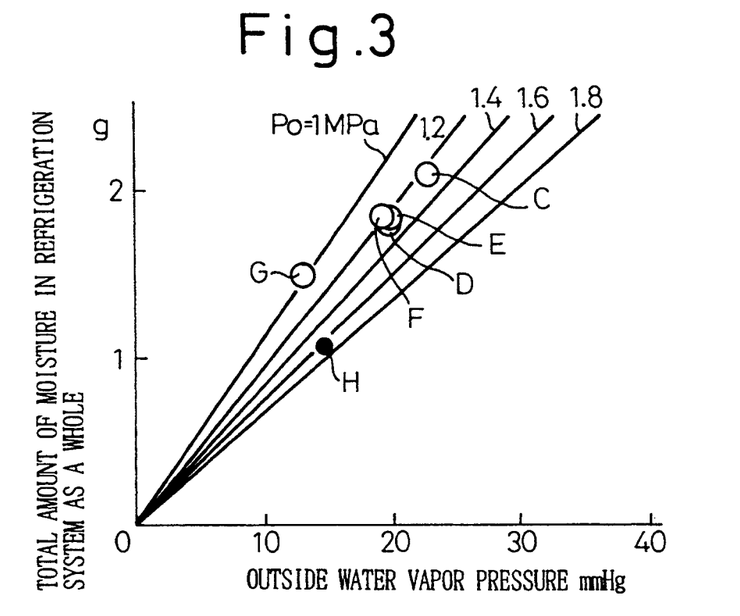
FIG. 3 is an explanatory view showing the total amount of the moisture of the refrigeration system as a whole at the time of actuation of the refrigeration system.

FIG. 3 shows the results of our studies. The horizontal axis shows the partial pressure of water vapor in the atmosphere, while the vertical axis shows the total amount of the moisture of the refrigeration system as a whole. Note that the refrigeration system used was the refrigeration system shown in FIG. 1. The discharge capacity of the compressor 1 was 170 cc, the amount of the refrigerant sealed in the refrigeration system was 700 g, and the amount of the lubricating oil sealed in and circulating in the refrigeration system together with the refrigerant was 20 g. As the refrigerant, use was made of HFC134a. As the lubricating oil, use was made of a polyalkyleneglycol type synthetic oil.

The point shown by C in FIG. 3 shows the partial pressure of water vapor at an air temperature of 28.1° C. and a humidity of 81 percent. The state of C shows the average state in the summer in Naha city, Okinawa prefecture, Japan. The point shown by D in FIG. 3 shows the partial pressure of water vapor at a state of an air temperature of 26.8° C. and a humidity of 76 percent. The state of D corresponds to the average air conditions of Nagoya city, Japan in the summer. Further, the point shown by E in FIG. 3 shows the partial pressure of water vapor in the state of an air temperature of 28.0° C. and a humidity of 70 percent. This state corresponds to the average air conditions in Osaka city, Japan in the summer. Further, the point shown by F in FIG. 3 shows the partial pressure of water vapor in a state of an air temperature of 26.7° C. and a humidity of 75 percent. This state corresponds to the average air conditions in the summer in Tokyo, Japan. The point shown by G in FIG. 3 shows the state of an air temperature of 17.6° C. and a humidity of 88 percent and corresponds to the average air conditions in the sunnier in Kushiro city, Hokkaido, Japan.

The state shown by the black dot H in FIG. 3 shows the state of an air temperature of 25° C. and a humidity of 50 percent under the same conditions as the experiment of FIG. 2.

Figure 4:
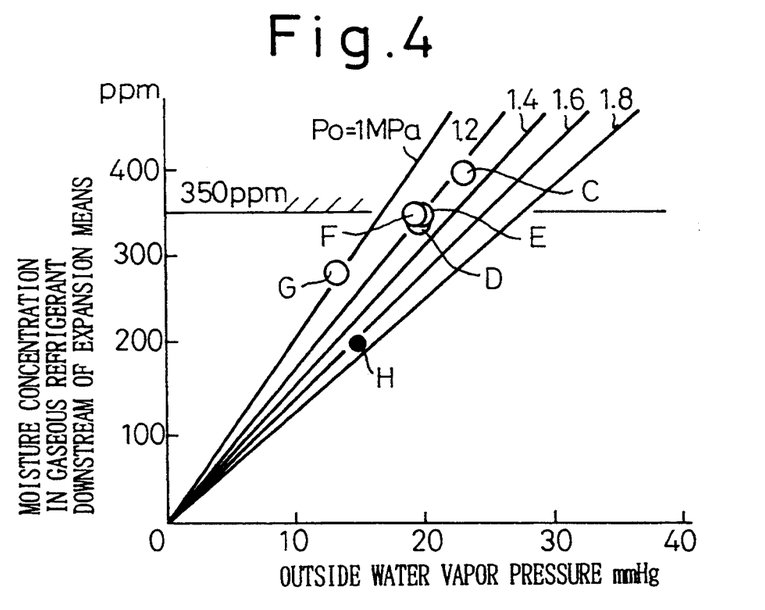
FIG. 4 is an explanatory view showing the saturated moisture concentration at the time of actuation of the refrigeration system.

In FIG. 3, the vertical axis shows the total amount of the moisture of the refrigeration system as a whole, but this is converted to the refrigerant moisture concentration in FIG. 4.

FIG. 4 shows the balanced state of the moisture at the downstream side of the expansion valve 5 in the operating state of the refrigeration system. The entry and exit of the moisture are through the flexible hose 2a at the discharge side of the compressor and the flexible hose 2b at the suction side of the same. The pressure at the discharge side of the compressor fluctuates from 1 megapascal to 1.8 megapascals. The output of the discharge side of the compressor, however, also fluctuates due to the cooling load, so the points C to G were plotted at the positions corresponding to the discharge pressures of the compressor at the time of the cooling load, converted from their respective air conditions.

As clear from FIG. 4, the refrigerant moisture concentration at the experimental condition H becomes 200 ppm. This matches well with the experimental results of FIG. 2. Further, from FIG. 4, it was confirmed that in the normal region of use, the moisture concentration in gaseous refrigerant at the downstream side of the expansion valve 5 balances at about 350 ppm.

Note that the experimental results shown in FIG. 3 and FIG. 4 were arranged based on the relationship between the total amount of the moisture of the refrigeration system as a whole shown in FIG. 5 and the moisture concentration. That is, in the experimental apparatus we used, the relationship between the total amount of moisture in the refrigeration system and the moisture concentration in the refrigerant was of substantially a linear correspondence as shown in FIG. 5.

In the experiments of FIG. 3 and FIG. 4, note was taken of the moisture balance at the downstream side of the expansion valve 5 during operation of the refrigeration system, but we next studied the moisture balance at the time of cessation of operation of the refrigeration system.

Figure 6:
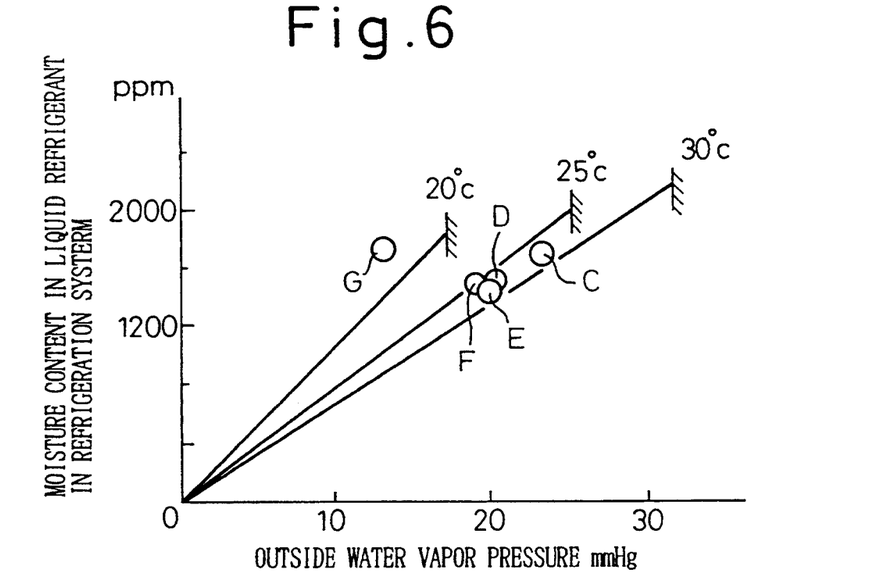
FIG. 6 is an explanatory view showing the saturated moisture concentration at the time of stopping of the refrigeration system.

When a long time passes after the refrigeration system is stopped, the pressures at the discharge side and suction side of the compressor 1 become equal, the refrigerant no longer becomes superheated or supercooled, and most of it becomes liquid refrigerant. The pressure of the refrigerant made equal in pressure at this time differs mainly depending on the air temperature in the surroundings in which the refrigeration system is placed, but usually it is about 5 to 6 atmospheres. FIG. 6 shows the balanced moisture concentration in the liquid refrigerant downstream of the expansion valve 5 at the time the operation of the refrigeration system is stopped. The points C to G show the same air conditions as in FIG. 3. That is, the point C shows the air conditions of a temperature of 28.1° C. and a humidity of 81 percent, the point D shows the air conditions of a temperature of 26.8° C. and a humidity of 76 percent, the point E shows the air conditions of a temperature of 28.0° C. and a humidity of 70 percent, the point F shows the air conditions of a temperature of 26.7° C. and a humidity of 75 percent, and the point G shows the air conditions of a temperature of 17.6° C. and a humidity of 88 percent. Further, the straight lines in FIG. 6 show the balanced moisture concentration in the liquid refrigerant in the refrigeration system at outside water vapor pressures at 20° C., 25° C., and 30° C. At this time, for example, at an air temperature of about 20° C., the pressure of the refrigerant equalized in pressure in the refrigeration system becomes 5 atmospheres or so.

Figure 7:
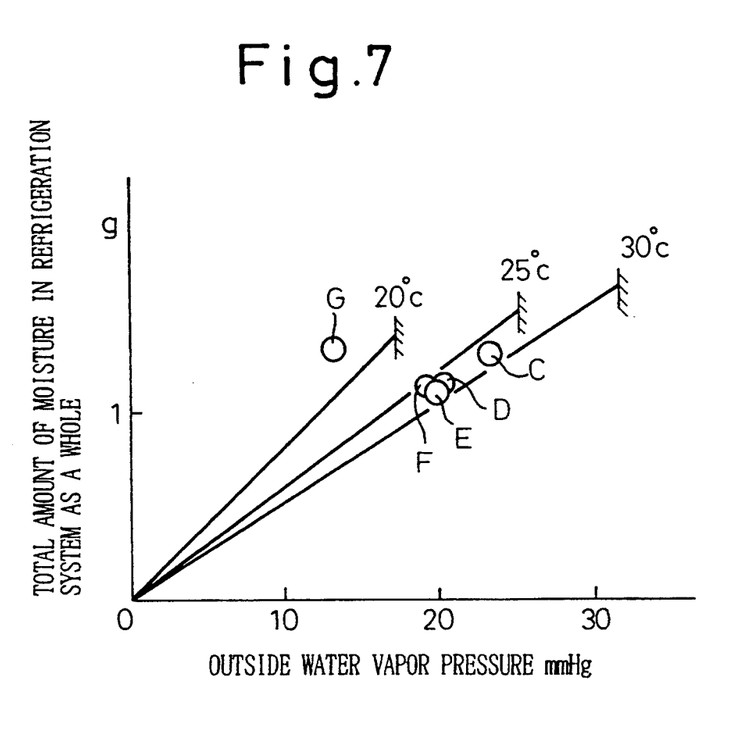
FIG. 7 is an explanatory view showing the total amount of the moisture of the refrigeration cycle as a whole at the time of stopping of the refrigeration system.

FIG. 7 shows the experimental results of FIG. 6 by the total amount of moisture in the refrigeration system. As clear from the comparison of FIG. 3 and FIG. 7 and of FIG. 4 and FIG. 6, which show the operating states and nonoperating states of the refrigeration system, despite there not being a large difference in the total moisture contents of the refrigeration system in the two states, in the operating state of the air-conditioner where the compressor is actuated, the balanced moisture concentration at the downstream side of the expansion valve 5 was 350 ppm or so, while the balanced moisture concentration in the refrigeration system in the state with the compressor not operating became 1500 ppm or In this way, during operation of the air-conditioner, the balanced moisture concentration in the refrigerant was a low 350 ppm or so, while along with the stopping of the operation, the balanced moisture concentration in the refrigerant rose up to 1500 ppm or so. The reason was, according to our opinion, mainly the saturated moisture concentration of the lubricating oil circulating in the refrigeration system along with the refrigerant. That is, in our experiments, we had a lubricating oil comprised of a polyalkyleneglycol type synthetic oil circulate along with the HFC134a the refrigerant in the air-conditioner. This synthetic oil was able to dissolve a larger amount of moisture than even the refrigerant. In other words, the concentration of moisture dissolved without condensation in the lubricating oil was greater than the concentration of moisture dissolved in the refrigerant.

During operation of the air-conditioner, it was confirmed that the liquid lubricating oil could not dissolve in the gaseous refrigerant and that the lubricating oil condensed from the gaseous refrigerant. Therefore, since the lubricating oil in that state dissolves a large amount of moisture on its own, it is believed that the concentration of the moisture dissolved in the gaseous refrigerant declines. When the refrigeration system is stopped, however, almost all of the weight of the refrigerant in the apparatus becomes liquid in phase, not superheating or supercooling. A large amount of lubricating oil dissolves in this liquid refrigerant, so it is possible to deem the amount of moisture in the apparatus and the moisture concentration to be a uniform system governed by just the liquid moisture characteristics of the HFC134a shown overall in FIG. 8.

In this way, during operation of the refrigeration system, the liquid refrigerant and lubricating oil in the refrigeration system dissolves a large amount of moisture, so the moisture concentration in the gaseous refrigerant becomes lower. On the other hand, when the refrigeration system stops, almost all of the refrigerant in the apparatus becomes liquid refrigerant dissolving a large amount of lubricating oil and dissolves moisture uniformly under the same conditions no matter where in the refrigeration system, so the moisture concentration in the liquid refrigerant becomes higher compared with the time of operation.

Whatever the case, the detrimental effect on the operation of the refrigeration system due to entry of moisture into the refrigerant occurs when the refrigeration system is operating. That is, the problem is the frosting of the expansion means by the cooling caused by the reduced pressure expansion at the time of passage through the expansion means 5 during operation the refrigeration system. Therefore, when the refrigeration system stops, even assuming that the moisture condenses from the refrigerant, this in itself does not immediately pose a problem.

From the above results of experiments and studies, we confirmed that in the ordinary range of use, if use is made of a refrigerant having a saturated moisture concentration of at least 350 ppm, it is possible to prevent frosting accompanying condensation of moisture and therefore no detrimental effect is had on the actual operation of the refrigeration system.

That is, in the normal state of use, the balanced moisture concentration downstream of the expansion valve 5 after the moisture balance at the flexible hoses 2a and 2b is about 350 ppm. No greater amount of moisture than this will ever enter the refrigerant. In this case, also, if the refrigerant has a saturated moisture concentration of at least 350 ppm, all the moisture entering the refrigerant will be dissolved in the refrigerant and will not condense from the refrigerant. As a result, there will be no problems accompanying condensation of the moisture, that is, blocking of the expansion means by frosting due to the condensed moisture etc.

Here, when the region of use is a high temperature and high humidity region such as the point C in FIG. 4, the balanced moisture concentration downstream of the expansion valve 5 sometimes will be over 350 ppm, but this will not be great enough to immediately cause blocking of the expansion valve etc.

Figure 8:
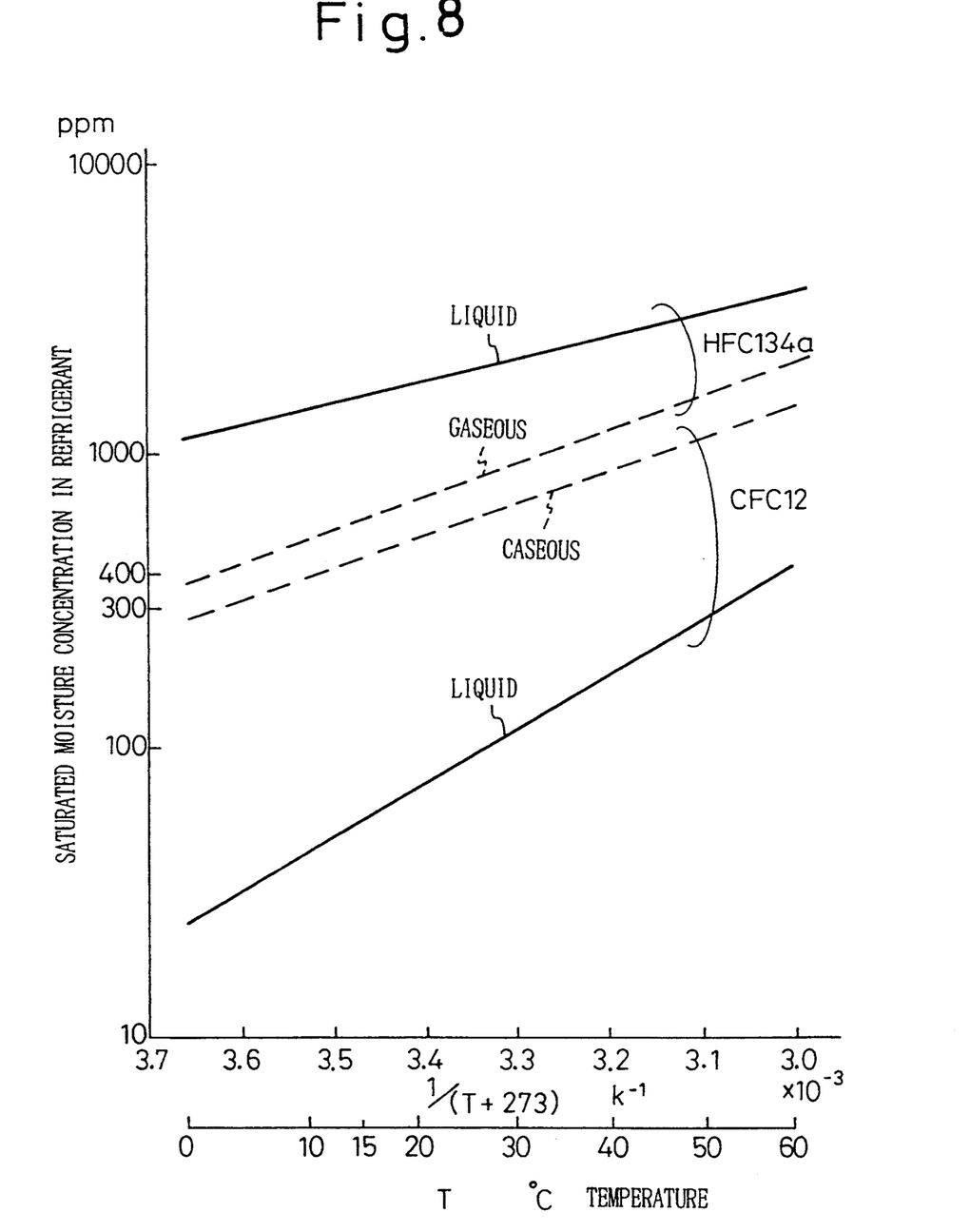
FIG. 8 is an explanatory view showing the saturated moisture concentrations of the refrigerant HFC134a and the refrigerant CFC12.

Therefore, we studied the refrigerant in the case of a saturated moisture concentration of at least 350 ppm for different areas of use. FIG. 8 shows the saturated moisture concentration characteristics of the refrigerant HFC134a and the refrigerant CFC12. The horizontal axis shows the temperature of the refrigerant, while the vertical axis shows the saturated moisture concentration in the refrigerant at those temperatures.

In the usual air-conditioner, the temperature of evaporation of the refrigerant is controlled to be 2° to 3° C. so as not to cause frosting on the surface of the evaporator 6. Therefore, the temperature of the refrigerant will never be far below 0° C. Thus, in the state of the refrigerant where the moisture can be most easily condensed, if the refrigerant has a saturated moisture concentration of at least 350 ppm, there will be no condensation of moisture from the refrigerant under any conditions.

As shown in FIG. 8, if the refrigerant HFC134a used as the refrigerant falls in temperature, the moisture starts to condense first from the gaseous phase portion with a lower saturated moisture concentration than the liquid phase portion, but the gaseous phase line of the refrigerant HFC134a is over 350 ppm even with a refrigerant temperature of 0° C., so the moisture will never condense from the gaseous refrigerant in the ordinary range of use of the refrigeration system. Therefore, there is no fear that the condensed moisture will end up frosting when passing through the expansion valve 5. As opposed to this, the refrigerant CFC12 has a lower saturated moisture concentration in the liquid phase than the gaseous phase. The saturated moisture concentration of the liquid refrigerant at 0° C. is just 25 ppm, so the moisture condenses from the liquid refrigerant of the gaseous-liquid two phase refrigerant after passing through the expansion valve 5 and ends up causing frosting.

In FIG. 3 and FIG. 4, the refrigeration system during operation of FIG. 1 is deemed a single system. We studied the permeation of moisture into the system and the state of balance. Details are given below.

The refrigerant temperature and pressure at different portions inside the refrigeration system at the time of operation are not uniform. The balanced moisture concentrations naturally differ at the flexible hose 2a at the discharge side of the compressor where the refrigerant is placed in a high temperature and high pressure state and the flexible hose 2b at the suction side of the compressor where it is placed in a low temperature and low pressure state. The balanced state is reached after the speed of moisture permeation to the inside and outside of the apparatus at the two hoses match.

In general, in a refrigeration system where a certain amount of moisture is sealed in, the balanced moisture concentration will be higher at the suction side flexible hose rather than the discharge side flexible hose. In particular, the flexible hose 2b at the suction side of the compressor is held at a low temperature due the temperature of the refrigerant, so the moisture in the atmosphere condenses and deposits on the surface of the flexible hose 2b and the partial pressure of the water vapor on the surface of the flexible hose 2b becomes higher. Therefore, for the moisture balance of the refrigeration system as a whole, moisture permeates into the refrigeration system through the flexible hose 2b of the suction side of the compressor, while moisture is discharged into the atmosphere through the flexible hose 2a of the discharge side of the compressor.

When the refrigeration system is assembled in the factory, a small amount of moisture sometimes mistakenly enters the apparatus, but by holding down permeation of moisture at the flexible hose 2b at the suction side of the compressor and allowing the permeation of moisture at the flexible hose 2a at the discharge side of the compressor, it is possible to quickly discharge the entering moisture into the atmosphere and reach the balanced moisture concentration in a short time. Further, it is possible to hold down the balanced moisture concentration. Therefore, the flexible hose 2b at the suction side of the compressor and the flexible hose 2a at the discharge side of the compressor are made different materials, with the flexible hose 2a of the discharge side of the compressor being made more permeable to moisture.

Next, a more detailed explanation will be given of a preferred embodiment of the present invention, though there may be some overlap with the above explanation.

Returning to FIG. 1, which was briefly explained above, 1 is a compressor for performing the compression and discharge of the refrigerant. This is mounted to the automobile engine and receives a driving force from the engine through a not shown belt and magnetic clutch 1a. That is, when the magnetic clutch 1a is energized, the rotational drive force is transmitted to the compressor 1 through the not shown belt, whereby compression and discharge of the refrigerant are performed. The flexible hoses 2a and 2b are provided at the discharge side and suction side of the refrigerant. Since the compressor 1 is mounted on the automobile engine, it vibrates due to the vibration of the automobile engine. The condenser 3, the evaporator 6, and other equipment are affixed to the automobile body, on the other hand, so the vibration systems are different.

The refrigerant lines 2 are comprised of metal pipes made of aluminum alloy. The flexible hoses 2a and 2b and the refrigerant lines 2 are joined through the joints 2c. In this example, the same nylon material is used for both the flexible hoses 2a and 2b. The inside diameters of the refrigerant passages are made 10 mm and 13 mm and the lengths are made 500 mm in both cases.

The flexible hose in this case includes hoses made of a wide range of flexible materials with a certain degree of moisture permeability, such as nylon and rubber.

The condenser 3 is placed at a position cooled by the air coming from the front of the automobile during motion so as to enable good heat exchange between the refrigerant and the outside air. At the side of the condenser 3, a receiver 4 is arranged. This receiver 4 absorbs the fluctuations in the flow of the refrigerant circulating in the refrigeration system. It receives the liquid refrigerant condensed by the condenser 3, performs gas-liquid phase condensation, then guides just the liquid phase refrigerant into the expansion means 5.

The expansion means 5 is installed in the automobile cabin along with the evaporator 6. This is an expansion valve which senses the state of the refrigerant at the outlet side of the evaporator 6 by a heat sensor 5a and changes the orifice of the passage so that the refrigerant at the outlet side of the evaporator 6 always has a predetermined degree of superheating. That is, when the cooling load is high and the degree of superheating of the refrigerant at the outlet side of the evaporator 6 becomes high, this state is fed back by the heat sensor 5a and the expansion means 5 opens the refrigerant passage to allow a larger amount of the refrigerant to circulate.

Conversely, when the cooling load is low, the evaporation action of the evaporator 6 falls, and the degree of superheating of the refrigerant at the outlet side of the evaporator 6 falls, this state is fed back to change the size of the orifice of the expansion means 5 using the heat sensor 5a. The expansion means 5 operates to narrow the refrigerant passage and reduce the amount of the refrigerant circulating through the refrigeration system. As mentioned earlier, the fluctuation in the flow of the circulating refrigerant caused by the change the size of the orifice by the expansion means 5 is absorbed by the receiver 4. That is, when the flow of the circulating refrigerant is small, a large amount of refrigerant is held in the receiver 4 as liquid refrigerant, while when the flow of the circulating refrigerant is large, the refrigerant is supplied from the refrigerant 4.

Here, the expansion means 5 expands the refrigerant by reducing the pressure and changes it from a high temperature, high pressure liquid refrigerant to a low temperature, low pressure mist-like refrigerant. As result, after passing through the expansion means 5, the refrigerant temperature rapidly drops. The refrigerant temperature has an effect on the surface temperature cf the evaporator 6, so usually this is made about 0° C. as not to cause frosting in the evaporator 6. However, when a particularly low temperature is required such as with the refrigerator of a refrigerated car, the evaporation temperature of the refrigerant is set lower.

Whatever the case, the refrigerant falls in temperature to about 0° C. after passing through the expansion means 5, so if moisture is condensed from the refrigerant, there is a danger that the moisture will cause frosting. Here, the expansion means 5 is set to a smaller orifice so as to expand the refrigerant by reducing the pressure, so if the moisture causes frosting, that frost may block the orifice of the expansion means 5.

In the embodiment, use is made of the refrigerant HFC134a as the refrigerant. The refrigerant HFC134a has a saturated moisture concentration in the gaseous phase of at least 350 ppm even in the low temperature state. In the usual area of use of the refrigeration system, the balanced moisture concentration of the refrigerant during operation is about 350 ppm in the case of the gaseous refrigerant downstream of the expansion means 5, so moisture will never condense when passing through the expansion means. Therefore, the above problem of frosting by moisture will not occur.

The evaporator 6 Is installed in the automobile cabin and performs heat exchange with the air in the cabin or air introduced from the outside, then sends the cooled air into the cabin.

Note that in the above embodiment, the flexible hose 2b at the suction side of the compressor 1 and the flexible hose 2a at the discharge side of the compressor 1 were made of the same material. The refrigeration system, however, sometimes contains a small amount of moisture mistakenly introduced at the time of assembly in the factory. In such a case, the refrigerant cannot contain all the moisture in the refrigeration system and some moisture will condense from the refrigerant. This can cause the problem of blocking of the orifice of the expansion means 5, as mentioned above.

The above problem is solved by using the change in the moisture permeability of the flexible hoses caused by changing the materials used. That is, the flexible hose $2a$ at the discharge side of the compressor 1 through which the moisture in the refrigeration system permeates to discharge into the atmosphere is formed of a material with a higher moisture permeability than the flexible hose $2b$ of the suction side of the compressor 1 through which the moisture in the atmosphere permeates to enter the refrigeration system. As shown by the dot-chain line Z in FIG. 2, the moisture in the apparatus is quickly discharged into the atmosphere and the time required until convergence to the balanced moisture concentration is reduced. Further, the balanced moisture concentration of the refrigeration system as a whole is held low.

Figure 9:
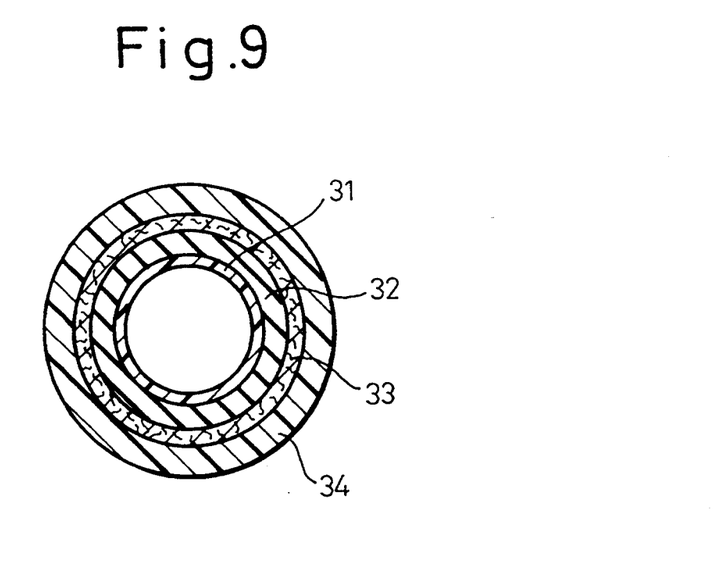
FIG. 9 is a sectional view of a flexible hose at the discharge side of the compressor.

For example, as the flexible hose $2a$ at the discharge side of the compressor, as shown in FIG. 9, use is made of a flexible hose B having as the material of the outside inner tube layer 32 highly moisture permeable nitrilbutadiene rubber (NBR). On the other hand, as the flexible hose $2b$ at the suction side of the compressor, use is made of a flexible hose A having as the material of the outside inner tube layer 32 the less moisture permeable chlorinated butyl rubber (Cl-IIR). Both hoses use as the materials of the inside inner tube layers 31 6-12 Nylon, which are moisture permeable, but which prevent the permeation of the refrigerant, use as the materials of the reinforcement layers 33 synthetic fibers such as polyethylene terephthalate, and use as the materials of the outer tube layer 34 the excellent heat resistance ethylene propylene rubber (EPDM).

Here, use may also be made of the high moisture permeability chlorosulfonated polyethylene rubber (CSM) as the material of the outside inner tube layer 32 of the flexible hose B.

Figure 10:
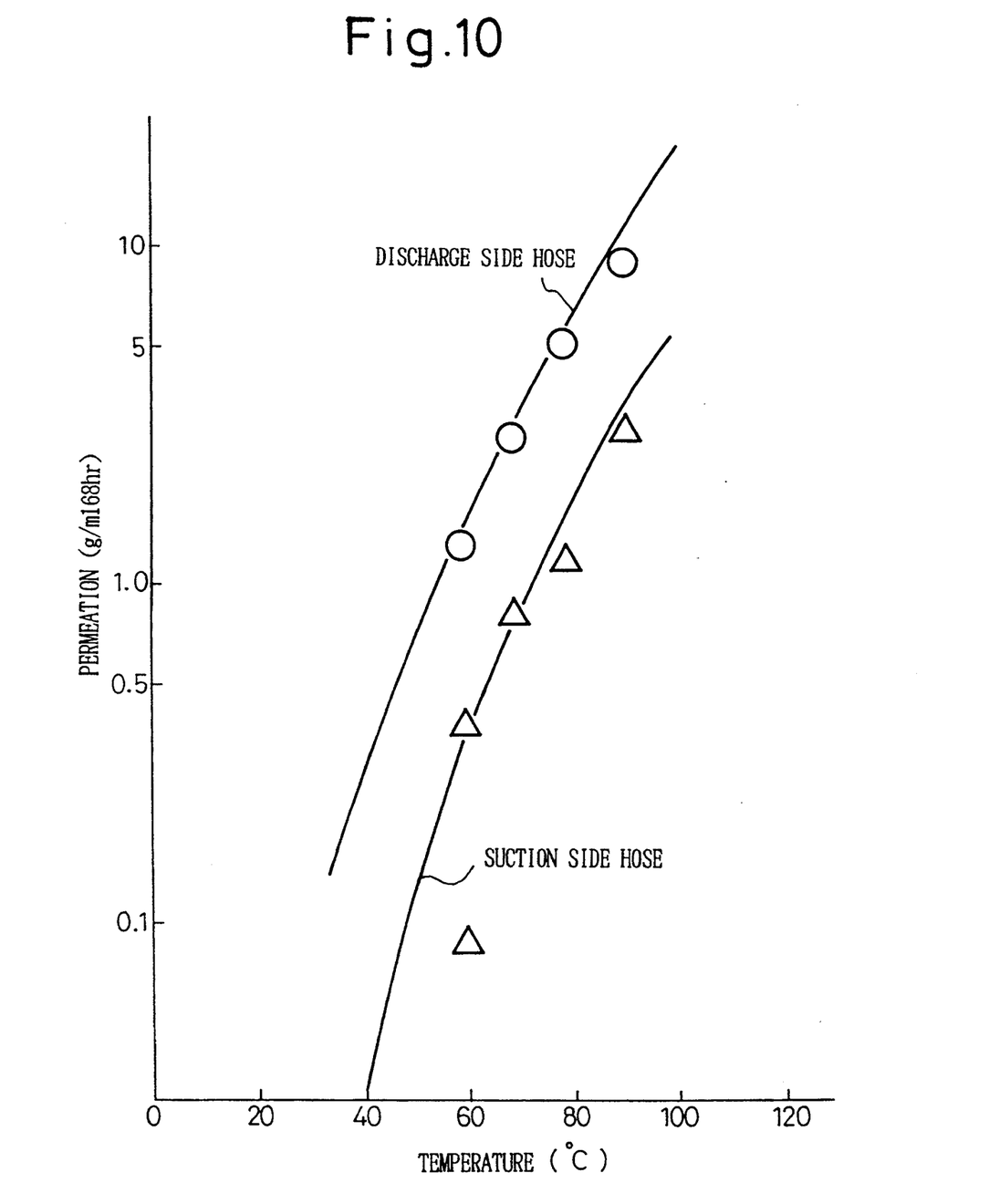
FIG. 10 is an explanatory view of the moisture permeation characteristics of the flexible hoses of the suction side and discharge side of the compressor.
Figure 11A:
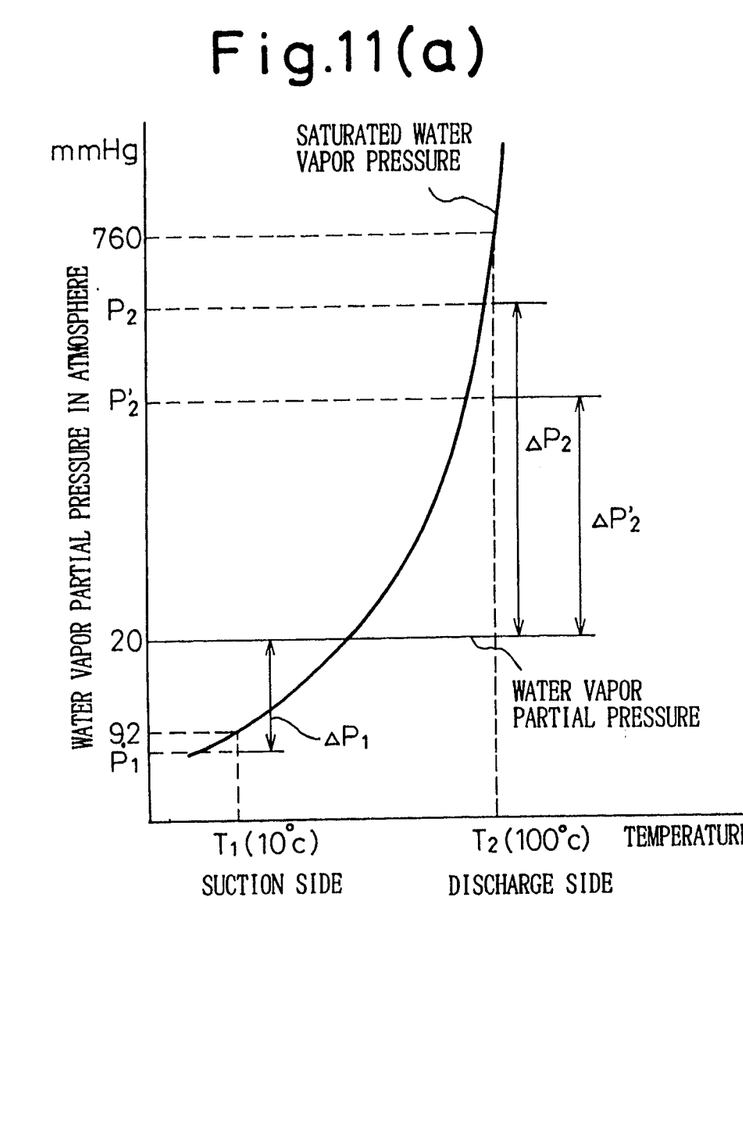
FIG. 11(a) is an explanatory view showing the decline of the balanced moisture concentration.
Figure 11B:
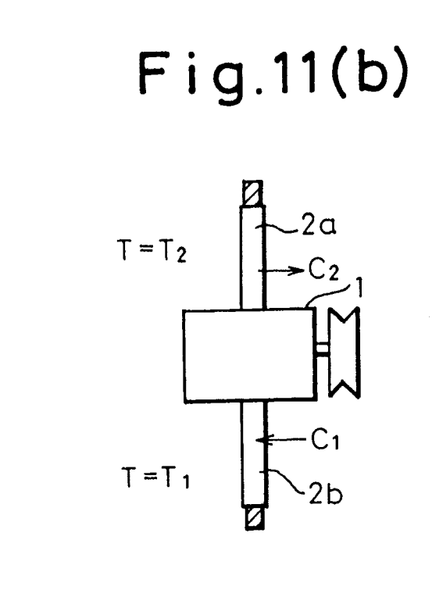
FIG. 11(b) is a schematic view of the operating state of the key components.

FIG. 10 is a view of the moisture permeability these two hoses. The hoses were placed in a thermoregulator with a humidity of 10 percent and the amounts of moisture permeating through the hoses were measured at different temperatures. As shown in FIG. 10, it is learned that the moisture permeability of the hose $2a$ of the discharge side of the compressor is close to three times greater than that of the hose $2b$ at the suction side of the compressor. Further, with both hoses, the higher the temperature, the greater the moisture permeability was. During operation, the refrigerant at the suction side of the compressor in the refrigeration system is low in temperature, while the refrigerant at the discharge side of the compressor is high in temperature, so the difference between the moisture permeations of the hose $2a$ at the discharge side of the compressor and the hose $2b$ at the suction side of the compressor becomes further larger, which is effective in achieving the object of the invention. Details will be explained below with reference to FIG. 11($a$) and ($b$).

The reference symbols used in FIG. 11($a$), ($b$) and the related expressions have the following meanings:
$T_1$: Temperature at suction side of compressor $T_2$: Temperature at discharge side of compressor a(T): Moisture permeation rate of hose A at temperature T
b(T): Moisture permeation rate of hose B at temperature T
$P_0$: Partial pressure of water vapor in atmosphere
$P_1$: Partial pressure of water vapor at time of moisture balance in hose $2b$ at suction side of compressor
$P_2$: Partial pressure of water vapor at time of moisture balance in hose $2a$ at discharge side of compressor
$\Delta P_1$: Differential pressure $P_0-P_0$ between partial pressure of water vapor in atmosphere and partial pressure of water vapor in hose at suction side of compressor
$\Delta P_2$: Differential pressure $P_2-P_0$ between partial pressure of water vapor in hose at discharge side of compressor and partial pressure of water vapor in atmosphere
$C_1$: Permeation speed of moisture passing through hose $2b$ at suction side of compressor and entering into refrigeration system
$C_2$: Permeation speed of moisture passing through hose $2a$ at discharge side of compressor and entering atmosphere When the same hose A was used for the discharge side of the compressor and the suction side of the compressor, the moisture permeation rate became higher the more toward the discharge side of the compressor where the temperature was higher, so there was the relation of expression (1):

$$a(T_1) < a(T_2) \qquad (1)$$

At this time, the moisture permeation speeds Chd 1 and $C_2$ are expressed by the product of the moisture permeation rates and the differential pressure and therefore become the expression (2) and the expression (3):

$$C_1 = a(T_1) \cdot \Delta P_1 \qquad (2)$$

$$C_2 = a(T_2) \cdot \Delta P_2 \qquad (3)$$

Here, the balancing of the moisture of the refrigeration system as a whole means the equalization of the permeation speed of the moisture entering the apparatus and the permeation speed of the moisture exiting to the atmosphere. At this time, the expression (4) stands:

$$C_1 = C_2 \qquad (4)$$

Therefore, from the expression (2) and expression (3), $$a(T_1) \cdot \Delta P_1 = a(T_2) \cdot \Delta P_2 \qquad (5)$$

This may be rearranged to the expression (6):

$$\Delta P_1 / \Delta P_2 = a(T_2) / a(T_1) \qquad (6)$$

Next, when use is made of the hose B, which has a higher moisture permeability than the hose A, for the hose $2a$ of the discharge side of the compressor, the relationship of the magnitude of the moisture permeation rate shown in expression (1) spreads further and becomes as shown in expression (7). Here, to differentiate the symbols from the previous ones, apostrophes are added to the $P_1$ and $P_2$.

$$a(T_1) << b(T_2) \qquad (7)$$

In the same way as above, the moisture permeation speeds $C_1$ and $C_2$ are expressed by the products of the moisture permeation rates and the differential pressures, given by expression (8) and expression (9):

$$C_1 = a(T_1) \cdot \Delta P_1' \quad (8)$$

$$C_2 = a(T_2) \cdot \Delta P_2' \quad (9)$$

Here, the balancing of the moisture of the refrigeration system as a whole means the equalization of the permeation speed of the moisture entering the apparatus and the permeation speed of it exiting into the atmosphere, as mentioned above, so the expression (4) stands.

Therefore, from expression (4), expression (8), and expression (9), $$a(T_1) \cdot \Delta P_1' = b(T_2) \cdot \Delta P_2' \quad (10)$$

This can be rearranged as shown in expression (11):

$$\Delta P_1'/\Delta P_2' = b(T_2)/a(T_1) \quad (11)$$

Here, the hose B has a higher moisture permeability than the hose A, so $$b(T_2) >> a(T_2) \quad (12)$$

therefore from expression (6) and expression (11), expression (13) stands:

$$\Delta P_1/\Delta P_2 << \Delta P_1'/\Delta P_2' \quad (13)$$

Here, as will be understood from FIG. 11(a), as the temperature rises, the saturated water vapor pressure sharply rises, so rather than the differential pressures $\Delta P_1$, $\Delta P_1'$ with the partial pressure of the water vapor in the atmosphere at the suction side of the compressor, the differential pressures $\Delta P_2$, $\Delta P_2'$ with the partial pressure of the water vapor in the atmosphere at the discharge side of the compressor are dominant with respect to the inequality of expression (13):

$$\Delta P_2 > \Delta P_2' \quad (14)$$

The partial pressures $P_2$ and $P_2'$ of the water vapor in the flexible hoses at the time of moisture balance at the discharge side of the compressor in these cases are:

$$P_2 = P_0 + \Delta P_2 \quad (15)$$

$$P_2' = P_0 + \Delta P_2' \quad (16)$$

so $$\quad (17)$$

Figure 12:
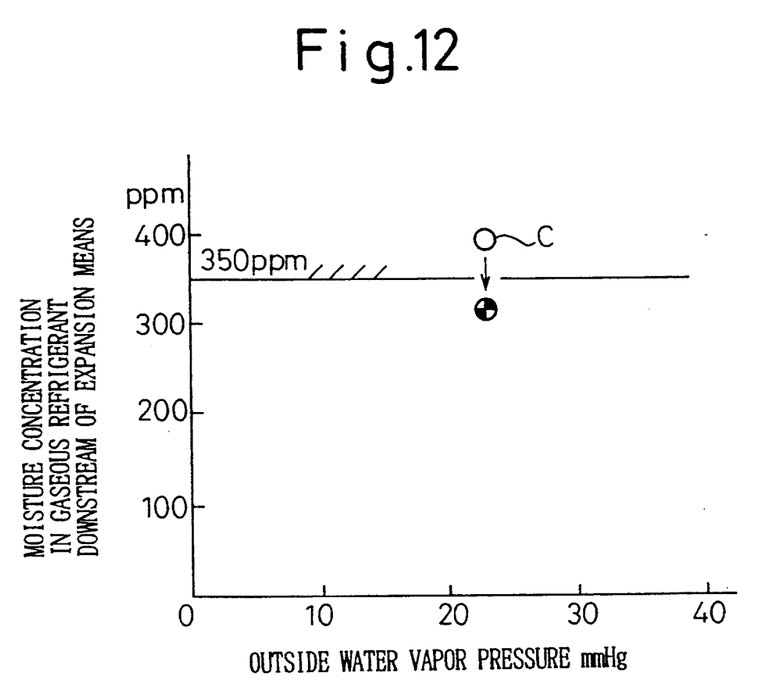
FIG. 12 is a view showing the effect of the decline of the balanced moisture concentration.

Compared with when use is made of the same hose A for both the discharge side and suction side of the compressor, when use is made of the hose B with the high moisture permeability for the hose 2a at the discharge side of the compressor, the partial pressure of the water vapor at the discharge side of the compressor at the time of moisture balance becomes smaller. Along with this, the balanced moisture concentration at the discharge side of the compressor falls and in turn the balanced moisture concentration of the refrigeration system as a whole falls. For example, as shown in FIG. 12, even in regions with extremely high temperatures and humidities such as the point C in FIG. 4, the balanced moisture concentration at the time of operation can be reduced to under 350 ppm.

In the above embodiment, use was made of the refrigerant HFC134a as the refrigerant circulating through the refrigeration system, but all that is necessary is that the refrigerant be one with a saturated moisture concentration in the low temperature state higher than 350 ppm. For example, the refrigerant HFC22 also has a saturated moisture concentration at times of low temperature of at least 350 ppm, so can also be used.

Further, in the above embodiment, use was made of flexible hoses for just the suction side and discharge side of the compressor 1, but these may also be used at other locations of the refrigeration system, for example, between the receiver 4 and the expansion valve 5 or between the condenser 3 and the receiver 4. In particular, in this case, connection of the lines becomes easy even with a slight deviation in the positions of the condenser 3, receiver 4, and expansion valve 5. Further, instead of the flexible hoses, use may be made of materials with moisture permeability at parts of metal lines. In this case, the freedom of installation is lost, but the function of the present invention of balancing the moisture in the refrigeration system and the outside world can be achieved through the hoses (water permeable material).

Note that in this embodiment, along with the refrigerant HFC134a used as the refrigerant, a polyalkyleneglycol type synthetic oil was circulated through the refrigeration system. This polyalkyleneglycol type synthetic oil acts as a lubricating oil. It is taken into the compressor 1 along with the refrigerant and lubricates the sliding portions of the compressor. Further, the polyalkyleneglycol type synthetic oil has a saturated moisture concentration higher than the refrigerant HFC134a, so when the lubricating oil condenses from the refrigerant during operation of the refrigeration system, that condensed lubricating oil can capture the moisture entering into the refrigeration system.

We claim:

1. A refrigeration system provided with a compressor which compresses and discharges a refrigerant, a condenser which condenses the refrigerant discharged from said compressor, an expansion means which reduces the pressure and expands the liquid refrigerant condensed by said condenser, an evaporator which causes the refrigerant reduced in pressure by said expansion means to evaporate, and refrigerant lines connected to these equipment and constituting a closed circuit, wherein a moisture permeable material is used for part of said refrigerant lines, the refrigerant used has a saturated moisture concentration in the low temperature and low pressure state at the downstream side of said expansion means during operation of said compressor which is higher than 350 ppm in the state where the amounts of moisture entering and leaving said refrigeration system are balanced, lubricating oil for said compressor is mixed in with said refrigerant, and said refrigerant and lubricating oil are made to circulate in said closed circuit of said refrigerant lines and prevent condensation of moisture from said refrigerant passing through said expansion means in the absence of a drier for absorbing the moisture, whereby a refrigeration system of relatively small size can be provided.

2. A refrigeration system as set forth in claim 1, wherein said refrigerant is the refrigerant HFC134a.

3. A refrigeration system as set forth in claim 1, wherein said refrigerant is the refrigerant HFC22.

4. A refrigeration system as set forth in claim 1, wherein said lubricating oil has a saturated moisture concentration greater than the saturated moisture concentration of said refrigerant.

5. A refrigeration system as set forth in claim 2, wherein said lubricating oil has a saturated moisture concentration greater than the saturated moisture concentration of said refrigerant.

6. A refrigeration system as set forth in claim 3, wherein said lubricating oil has a saturated moisture concentration greater than the saturated moisture concentration of said refrigerant.

7. A refrigeration system as set forth in claim 1, wherein said lubricating oil ia a polyalkyleneglycol type synthetic oil.

8. A refrigeration system as set forth in claim 4, wherein said lubricating oil is a polyalkyleneglycol type synthetic oil.

9. A refrigeration system as set forth in claim 5, wherein said lubricating oil is a polyalkyleneglycol type synthetic oil.

10. A refrigeration system as set forth in claim 6, wherein said lubricating oil is a polyalkyleneglycol type synthetic oil.

11. A refrigeration system provided with a compressor which compresses and discharges a refrigerant, a condenser which condenses the refrigerant discharged from said compressor, an expansion means which reduces the pressure and expands the liquid refrigerant condensed by said condenser, an evaporator which causes the refrigerant reduced in pressure by said expansion means to evaporate, and refrigerant lines connected to these equipment and constituting a closed circuit, wherein the refrigerant used has a saturated moisture concentration in the low temperature and low pressure state at the downstream side of said expansion means which is higher than 350 ppm in the state where the amounts of moisture entering and leaving said refrigeration system are balanced, for said refrigerant lines, use is made of a moisture permeable material for the discharge side and the suction side of said compressor, further, for the refrigerant line, the moisture permeation of said refrigerant line at said discharge side of said compressor is set to be larger than the moisture permeation of said refrigerant line at said suction side of said compressor, and said refrigerant and lubricating oil are made to circulate in said closed circuit and prevent condensation of moisture from said refrigerant from passing through said expansion means, in the absence of a drier for absorbing the moisture.

12. A refrigeration system provided with a compressor which compresses and discharges a refrigerant, a condenser which condenses the refrigerant discharged from said compressor, an expansion means which reduces the pressure and expands the liquid refrigerant condensed by said condenser, an evaporator which causes the refrigerant reduced in pressure by said expansion means to evaporate, and refrigerant lines connected to these equipment and constituting a closed circuit, wherein a moisture permeable material is used for part of said refrigerant lines, the refrigerant used has a saturated moisture concentration in the low temperature and low pressure state at the downstream side of said expansion means during operation of said compressor which is higher than the moisture concentration in the state where the amounts of moisture entering and leaving said refrigeration system are balanced, lubricating oil for said compressor is mixed in with said refrigerant, and said refrigerant and lubricating oil are made to circulate in said closed circuit and prevent condensation of moisture from said refrigerant from passing through said expansion means, in the absence of a drier for absorbing the moisture, whereby a refrigeration system of relatively small size can be provided.

* * * * *